US012703161B2

(12) United States Patent
Breitkopf et al.

(10) Patent No.: US 12,703,161 B2
(45) Date of Patent: Aug. 11, 2026

(54) METHOD FOR PRODUCING WETTABLE SILICONE HYDROGEL CONTACT LENSES

(71) Applicant: Alcon Inc., Fribourg (CH)

(72) Inventors: Richard Charles Breitkopf, Dunwoody, GA (US); Feng Jing, Alpharetta, GA (US); Daqing Wu, Suwanee, GA (US); Jack W. Trieu, Atlanta, GA (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 181 days.

(21) Appl. No.: 18/586,910

(22) Filed: Feb. 26, 2024

(65) Prior Publication Data

US 2024/0293985 A1 Sep. 5, 2024

Related U.S. Application Data

(60) Provisional application No. 63/487,046, filed on Feb. 27, 2023.

(51) Int. Cl.

| | |
|---|---|
| ***B29D 11/00*** | (2006.01) |
| ***B29C 33/40*** | (2006.01) |
| ***B29C 35/02*** | (2006.01) |
| ***B29K 83/00*** | (2006.01) |
| ***B29K 105/00*** | (2006.01) |
| ***B29K 105/16*** | (2006.01) |
| ***G02C 7/04*** | (2006.01) |

(52) U.S. Cl.

CPC ........ *B29D 11/00865* (2013.01); *B29C 33/40* (2013.01); *B29C 35/0227* (2013.01); *B29D 11/00067* (2013.01); *B29D 11/00125* (2013.01); *B29K 2083/00* (2013.01); *B29K 2105/0002* (2013.01); *B29K 2105/0061* (2013.01); *B29K 2105/16* (2013.01); *B29K 2823/12* (2013.01); *B29K 2995/0093* (2013.01); *G02C 7/049* (2013.01)

(58) Field of Classification Search

CPC ........ B29D 11/00865; B29D 11/00067; B29D 11/00125; B29D 11/0048; B29D 11/00038; B29D 11/00134; B29C 33/40; B29C 35/0227; B29C 33/3842; B29K 2083/00; B29K 2105/0002; B29K 2105/0061; B29K 2105/16; B29K 2823/12; B29K 2995/0093; G02C 7/049

See application file for complete search history.

(56) References Cited

U.S. PATENT DOCUMENTS

| | | | | |
|---|---|---|---|---|
| 4,136,250 | A | | 1/1979 | Mueller et al. |
| 4,153,641 | A | | 5/1979 | Deichert et al. |
| 4,182,822 | A | | 1/1980 | Chang |
| 4,189,546 | A | | 2/1980 | Deichert et al. |
| 4,254,248 | A | | 3/1981 | Friends et al. |
| 4,259,467 | A | | 3/1981 | Keogh et al. |
| 4,260,725 | A | | 4/1981 | Keogh et al. |
| 4,261,875 | A | | 4/1981 | LeBoeuf |
| 4,276,402 | A | | 6/1981 | Chromecek |
| 4,327,203 | A | | 4/1982 | Deichert et al. |
| 4,341,889 | A | | 7/1982 | Deichert et al. |
| 4,343,927 | A | | 8/1982 | Chang |
| 4,355,147 | A | | 10/1982 | Deichert et al. |
| 4,444,711 | A | | 4/1984 | Schad |
| 4,460,534 | A | | 7/1984 | Boehm et al. |
| 4,486,577 | A | | 12/1984 | Mueller et al. |
| 4,543,398 | A | | 9/1985 | Bany et al. |
| 4,605,712 | A | | 8/1986 | Mueller et al. |
| 4,661,575 | A | | 4/1987 | Tom |
| 4,684,538 | A | | 8/1987 | Klemarczyk |
| 4,703,097 | A | | 10/1987 | Wingler et al. |
| 4,833,218 | A | | 5/1989 | Lee |
| 4,837,289 | A | | 6/1989 | Mueller et al. |
| 4,929,693 | A | | 5/1990 | Akashi et al. |
| 4,954,586 | A | | 9/1990 | Toyoshim et al. |
| 4,954,587 | A | | 9/1990 | Mueller |
| 5,010,141 | A | | 4/1991 | Mueller |
| 5,034,461 | A | | 7/1991 | Lai et al. |
| 5,039,761 | A | | 8/1991 | Ono et al. |
| 5,070,170 | A | | 12/1991 | Robertson et al. |
| 5,070,215 | A | | 12/1991 | Bambury et al. |
| 5,079,319 | A | | 1/1992 | Mueller |
| 5,158,718 | A | * | 10/1992 | Thakrar .................. B29C 59/10 264/2.6 |
| 5,166,345 | A | | 11/1992 | Akashi et al. |
| 5,346,946 | A | | 9/1994 | Yokoyama et al. |
| 5,358,995 | A | | 10/1994 | Lai et al. |

(Continued)

OTHER PUBLICATIONS

Bhamla, et al.; "Influence of Lipid Coatings on Surface Wettability Characteristics of Silicone Hydrogels"; Langmuir, vol. 31; pp. 3820-3828, 2015.

*Primary Examiner* — Inja Song

(74) *Attorney, Agent, or Firm* — Jian Zhou

(57) ABSTRACT

The invention provides a method for producing coated silicone hydrogel contact lenses in a cost-effective manner. The method comprises treating the molding surfaces of polypropylene lens molds (or other hydrophobic plastic molds) with a vacuum UV or a corona plasma to increase the surface energies of the molding surfaces of the lens molds, cast-molding a silicone hydrogel lens formulation containing a relatively small amount of at least one carboxyl-containing vinylic monomer in the treated lens molds, and heating resultant cast-molded silicone hydrogel contact lenses in an aqueous coating solution comprising a water-soluble and thermally crosslinkable polymeric material to form a coated silicone hydrogel contact lens comprising a bulk silicone hydrogel material and a hydrogel layer covalently attached onto the bulk silicone hydrogel material.

15 Claims, No Drawings

(56) References Cited

U.S. PATENT DOCUMENTS 5,387,632 A 2/1995 Lai et al.
5,416,132 A 5/1995 Yokoyama et al.
5,449,729 A 9/1995 Lai
5,451,617 A 9/1995 Lai et al.
5,486,579 A 1/1996 Lai et al.
5,760,100 A 6/1998 Nicolson et al.
5,843,346 A 12/1998 Morrill
5,894,002 A 4/1999 Boneberger et al.
5,962,548 A 10/1999 Vanderlaan et al.
5,981,675 A 11/1999 Valint, Jr. et al.
6,017,121 A 1/2000 Chateau et al.
6,019,914 A 2/2000 Lokshin et al.
6,039,913 A 3/2000 Hirt et al.
6,113,814 A 9/2000 Gemert et al.
6,149,841 A 11/2000 Kumar
6,166,236 A 12/2000 Bambury et al.
6,218,508 B1 4/2001 Kragh et al.
6,296,785 B1 10/2001 Nelson et al.
6,310,116 B1 * 10/2001 Yasuda .................... C08J 5/00
523/105
6,348,604 B1 2/2002 Nelson et al.
6,440,571 B1 8/2002 Valint, Jr. et al.
6,762,264 B2 7/2004 Kunzler et al.
6,867,245 B2 3/2005 Iwata et al.
7,214,809 B2 5/2007 Zanini et al.
7,423,074 B2 9/2008 Lai et al.
7,556,750 B2 7/2009 Xiao et al.
7,584,630 B2 9/2009 Van Gemert
7,605,190 B2 10/2009 Moszner et al.
7,999,989 B2 8/2011 Asai et al.
8,158,037 B2 4/2012 Chopra et al.
8,163,206 B2 4/2012 Chang
8,415,405 B2 4/2013 Maggio et al.
8,475,529 B2 7/2013 Clarke
8,480,227 B2 7/2013 Qiu et al.
8,529,057 B2 9/2013 Qiu et al.
8,614,261 B2 12/2013 Iwata et al.
8,658,748 B2 2/2014 Liu
8,697,770 B2 4/2014 Duis et al.
8,741,188 B2 6/2014 Chopra et al.
8,835,525 B2 9/2014 Kuyu et al.
8,993,651 B2 3/2015 Chang et al.
9,052,438 B2 6/2015 Xiao et al.
9,097,840 B2 8/2015 Chang
9,097,916 B2 8/2015 Chopra et al.
9,103,965 B2 8/2015 Chang
9,187,601 B2 11/2015 Huang
9,217,813 B2 12/2015 Liu et al.
9,315,669 B2 4/2016 Holland
9,422,447 B2 8/2016 Holland et al.
9,465,234 B2 10/2016 Chopra
9,475,827 B2 10/2016 Chang
9,505,184 B2 11/2016 Kolluru
9,720,138 B2 8/2017 Chang
9,904,074 B2 2/2018 Duis
10,081,697 B2 9/2018 Huang
10,197,707 B2 2/2019 Xiao
10,301,451 B2 5/2019 Jing
10,449,740 B2 10/2019 Qian et al.
10,465,047 B2 11/2019 Jing
11,256,003 B2 2/2022 Qiu et al.
2003/0197833 A1 * 10/2003 Hiratani ........... B29D 11/00125
351/159.33
2015/0316688 A1 11/2015 Cefalo et al.
2016/0061995 A1 3/2016 Chang
2016/0159019 A1 * 6/2016 Bruce .............. B29D 11/00038
264/2.6
2017/0173901 A1 * 6/2017 Jobe ................. B29D 11/00134
2018/0100038 A1 4/2018 Jing
2019/0263971 A1 * 8/2019 Zhang ................ B29D 11/0048
2021/0181379 A1 * 6/2021 Zheng ..................... C08L 83/04
2022/0251302 A1 8/2022 Chang et al.

* cited by examiner

METHOD FOR PRODUCING WETTABLE SILICONE HYDROGEL CONTACT LENSES

This application claims the benefits under 35 USC § 119(e) of U.S. provisional application No. 63/487,046, filed on 27 Feb. 2023, incorporated by reference in its entirety.

The present invention is related to a method for producing optically-clear and wettable silicone hydrogel contact lenses in a cost-effective and environmentally friendly manner. The present invention is also related to wettable silicone hydrogel contact lenses made according to a method of the invention.

BACKGROUND

Most commercially available SiHy contact lenses are produced according to a conventional cast molding technique involving use of disposable plastic molds and a SiHy lens-forming composition (or a SiHy lens formulation) that generally includes one or more silicone-containing polymerizable components and at least one hydrophilic polymerizable component. However, silicone-containing polymerizable components and hydrophilic polymerizable components are not miscible (compatible with each other) sufficiently to form an optically clear lens formulation for making optically clear SiHy contact lenses. Moreover, the silicone-containing components are typically not soluble in water or an ophthalmically-compatible solvent (as non-reactive diluent). As such, one or more ophthalmically incompatible organic solvents have to be used in a SiHy lens formulation.

Furthermore, some polymerizable components in a SiHy lens formulation may not be ophthalmically compatible. Unreacted and partially-reacted polymerizable components left in resultant SiHy contact lenses formed from a SiHy lens formulation need to be removed in an extraction process involving use of one or more ophthalmically incompatible organic solvents. Such lens extraction increases the production cost and decreases the production efficiency.

Because of use of one or more ophthalmically incompatible organic solvents in a SiHy lens formulation and in an extraction process, a solvent exchange or hydration process has been carried out in the production. Such solvent exchange or hydration process also increases the production cost and decreases the production efficiency.

Use of ophthalmically incompatible organic solvents in the production of SiHy contact lenses can be costly and is not environmentally friendly. It is desirable that a process for manufacturing SiHy contact lens does not involve use of any ophthalmically incompatible organic solvent.

In addition, a SiHy material typically has a surface, or at least some areas of its surface, which is hydrophobic (non-wettable) and susceptible to adsorbing lipids or proteins from the ocular environment and may adhere to the eye. Thus, a SiHy contact lens will generally require a surface modification. Recently, a new cost-effective approach has been described in U.S. Pat. Nos. 8,529,057 and 10,449,740 for applying a non-silicone hydrogel coating onto a SiHy contact lens, comprising a step of forming a base coating on a SiHy contact lens, one or more steps of rinsing the SiHy contact lens having the base coating thereon with a solvent, and a step of covalently attaching of a partially-crosslinked hydrophilic polymeric material onto the base coating directly in a lens package during autoclave. The base-coating forming and rinsing steps may not be environmentally friendly and/or can increase the production cost and decrease the production efficiency.

Therefore, there is still a need for a cost-effective and environmentally friendly method for producing SiHy contact lenses, especially wettable SiHy contact lenses.

SUMMARY OF THE INVENTION

The present invention, in one aspect, provides a method for producing coated silicone hydrogel contact lenses, comprising the steps of: (1) obtaining a lens mold made of a hydrophobic plastic material, wherein the lens mold comprises a first mold half having a first molding surface and a second mold half having a second molding surface; (2) treating the first and second molding surfaces by using a vacuum UV or a corona treatment (i.e., increasing surface energies of the first and second molding surfaces by treating them with a vacuum UV or a corona plasma); (3) introducing a polymerizable composition into the lens mold obtained in step (2), wherein the polymerizable composition comprises (a) at least one polysiloxane vinylic crosslinker and/or at least one siloxane-containing vinylic monomer, (b) from about 0.5% to about 4% by weight of at least one carboxyl-containing vinylic monomer relative to the total amount of all polymerizable components, (c) at least one hydrophilic vinylic monomer, (d) optionally but preferably at least one non-silicone vinylic crosslinker, and (e) at least one free-radical; (4) curing thermally or actinically the polymerizable composition in the lens mold to form a silicone hydrogel lens precursor comprising a bulk silicone hydrogel material that comprises carboxyl groups; (5) optionally hydrating the silicone hydrogel lens precursor obtained in step (4) in water or an aqueous solution to obtain a hydrated silicone hydrogel contact lens; and (6) heating the silicone hydrogel lens precursor obtained in step (4) or the hydrated silicone hydrogel contact lens obtained in step (5) directly in an aqueous solution having a pH from about 6.5 to about 9.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material, wherein the coated silicone hydrogel contact lens in fully-hydrated state exhibits a water-break-up-time (WBUT) of at least 10 seconds and an oxygen permeability of at least 50 barrers.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents.

As used in this application, the term "non-silicone hydrogel" or "non-silicone hydrogel material" interchangeably refers to a hydrogel that is theoretically free of silicon.

"Hydrophilic," as used herein, describes a material or portion thereof that will more readily associate with water than with lipids.

The term "room temperature" refers to a temperature of about 17° C. to about 26° C.

The term "soluble", in reference to a compound or material in a solvent, means that the compound or material can be dissolved in the solvent to give a solution with a concentration of at least about 0.5% by weight at room temperature.

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

The term "olefinically unsaturated group" or "ethylenically unsaturated group" is employed herein in a broad sense and is intended to encompass any groups containing at least one >C═$CH_2$ group. Exemplary ethylenically unsaturated groups include without limitation (meth)acryloyl (

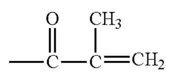

and/or

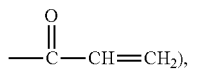

allyl, vinyl, styrenyl, or other C═$CH_2$ containing groups.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

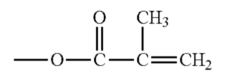

or

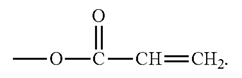

An "(meth)acrylamido monomer" refers to a vinylic monomer having one sole group of

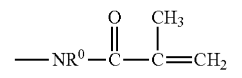

or

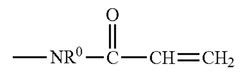

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (

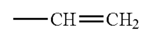

) that is directly attached to the nitrogen atom of the amide group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing or crosslinking one or more monomers or macromers or prepolymers or combinations thereof.

A "macromer" or "prepolymer" refers to a compound or polymer that has ethylenically unsaturated groups and a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1H$ NMR (Proton nuclear magnetic resonance) spectroscopy, etc.

A "polysiloxane segment" or "polydiorganosiloxane segment" interchangeably refers to a polymer chain segment (i.e., a divalent radical) of

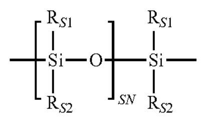

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^o$ (in which alk is $C_1$-$C_6$ alkylene diradical, $R^o$ is H or $C_1$-$C_4$ alkyl and $\gamma 1$ is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "optically clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

In this application, the term "polyoxazoline" refers to a polymer or polymer segment of

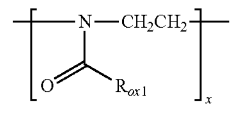

in which: $R_{ox1}$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500.

In this application, the term "poly(2-oxazoline-co-ethyleneimine)" refers to a statistical copolymer or a polymer segment thereof having a formula of

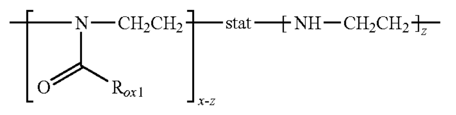

in which: $R_{ox1}$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_6$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (>90%) of the secondary amine groups of the poly(2-oxazoline-co-ethyleneimine) into azetidinium groups. Examples of poly (2-oxazoline-co-ethyleneimine)-epichlorohydrin are disclosed in U.S. pat. Appl. No. 2016/0061995A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged (i.e., cationic), divalent radical (or group or moiety) of

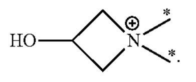

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at a temperature of from about 5° C. to about 15° C., to an extend detectable for a period of about one hour.

As used in this application, the term "phosphorylcholine" refers to a zwitterionic group of

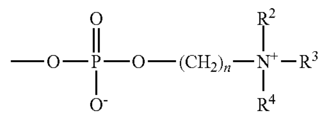

in which n is an integer of 1 to 5 and $R^2$, $R^3$ and $R^4$ independently of each other are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

As used in this application, the term "bulk silicone hydrogel material" in reference to a contact lens interchangeably means a layer of the silicone hydrogel material that has substantially the 3-dimensional shape of the contact lens.

The intrinsic "oxygen permeability", $Dk_i$, of a material is the rate at which oxygen will pass through a material. Oxygen permeability is conventionally expressed in units of barrers, where "barrer" is defined as [($cm^3$ oxygen)(mm)/($cm^2$)(sec)(mm Hg)]$\times10^{-10}$.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as [($cm^3$ oxygen)/($cm^2$)(sec)(mm Hg)]$\times10^{-9}$.

The term "modulus" or "elastic modulus" in reference to a contact lens or a material means the tensile modulus or Young's modulus which is a measure of the stiffness of a contact lens or a material.

The term "dry lens precursor" refers to a cast-molded contact lens that is obtained by cast-molding of a polymerizable composition in a mold and has not been subjected to extraction and/or hydration post-molding processes (i.e., having not been in contact with water or any organic solvent or any liquid after molding).

The term "a wettable silicone hydroge contact lens" means that the silicone hydrogel contact lens has a water-break-up-time ("WBUT") of at least 10 seconds, preferably at least 15 seconds, more preferably at least 20 seconds, even more preferably at least 25 seconds. WBUT can be measured according to the procedures described in Example 1.

The term "an optically-clear silicone hydrogel contact lens" means that the silicone hydrogel contact lens has a light transmissibility of at least 85%, preferably at least 90%, more preferably at least 93%, even more preferably at least 95% in the range from 400 to 700 nm. The light transmissibility of a contact lens in the range from 400 to 700 nm can be measured according to the procedures described in Example 1.

An "average water contact angle" refers to a water contact angle (measured by Sessile Drop), which is obtained by averaging measurements of at least 3 individual contact lenses or samples of a silicone hydrogel material.

A corona treatment (aka, so-called a "air plasma") refers to a surface modification technique that uses a low temperature corona discharge plasma to impart changes in the properties of a surface. The corona plasma is generated by the application of high voltage to an electrode that has a sharp tip.

The term "vacuum UV" refers to ultraviolet radiation with wavelengths below 200 nm.

In general, the invention is directed to a method for producing optically clear and wettable silicone hydrogel contact lenses in a cost-effective manner. The invention is based partly on the discovery that the molding surfaces of a polypropylene lens mold (or other hydrophobic plastic molds) can be treated with a vacuum UV or a corona plasma to increase the surface energy of the molding surfaces. By using such a treated lens mold, a carboxyl-containing vinylic monomer (e.g., acrylic acid or methacrylic acid) in a SiHy lens formulation would migrate to the molding surfaces of the lens mold due to its higher polarity. Resultant SiHy contact lenses can have a relatively higher carboxylic acid concentration on their surfaces, compared to SiHy contact lenses obtained from molding of the same SiHy lens formulation in untreated lens molds. Consequently, the amount of the carboxyl-containing vinylic monomer (e.g., acrylic acid or methacrylic acid) can be reduced (e.g., lower than 4% by weight, preferably lower than 3% by weight) in the SiHy lens formulation, thereby increasing the stability of the resultant SiHy contact lenses.

The present invention provides a method for producing coated silicone hydrogel contact lenses, comprising the steps of: (1) obtaining a lens mold made of a hydrophobic plastic material, wherein the lens mold comprises a first mold half having a first molding surface and a second mold half having a second molding surface; (2) treating the first and second molding surfaces by using a vacuum UV or a corona plasma (i.e., increasing surface energies of the first and second molding surfaces by treating them with a vacuum UV or a corona plasma); (3) introducing a polymerizable composition into the lens mold obtained in step (2), wherein the polymerizable composition comprises (a) at least one polysiloxane vinylic crosslinker and/or at least one siloxane-containing vinylic monomer, (b) from about 0.5% to about 4% by weight of at least one carboxyl-containing vinylic monomer relative to the total amount of all polymerizable components, (c) at least one hydrophilic vinylic monomer, (d) optionally but preferably at least one non-silicone vinylic crosslinker, and (e) at least one free-radical; (4) curing thermally or actinically the polymerizable composition in the lens mold to form a silicone hydrogel lens precursor comprising a bulk silicone hydrogel material that comprises carboxyl groups; (5) optionally hydrating the silicone hydrogel lens precursor obtained in step (4) in water or an aqueous solution to obtain a hydrated silicone hydrogel contact lens; and (6) heating the silicone hydrogel lens precursor obtained in step (4) or the hydrated silicone hydrogel contact lens obtained in step (5) directly in an aqueous solution having a pH from about 6.5 to about 9.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material, wherein the coated silicone hydrogel contact lens in fully-hydrated state exhibits a water-break-up-time (WBUT) of at least 10 seconds (preferably at least 15 seconds, more preferably at least 20 seconds, even more preferably at least 25 seconds) and an oxygen permeability of at least 50 barrers (preferably at least 60 barrers, more preferably at least 70 barrers, even more preferably at least 80 barrers).

Lens molds for making contact lenses including hydrogel contact lenses are well known to a person skilled in the art and, for example, are employed in cast molding or spin casting. For example, a mold (for cast molding) generally comprises at least two mold sections (or portions) or mold halves, i.e., first and second mold halves. The first mold half has a first molding (or optical) surface which is in direct contact with a polymerizable composition for cast molding of a contact lens and defines the posterior (concave) surface of a molded contact lens; and the second mold half has a second molding (or optical) surface which is in direct contact with the polymerizable composition and defines the anterior (convex) surface of the molded contact lens. The first and second mold halves are configured to receive each other such that a lens-forming cavity is formed between the first molding surface and the second molding surface.

Methods of manufacturing mold sections for cast molding a contact lens are generally well known to those of ordinary skill in the art. The process of the present invention is not limited to any particular method of forming a mold. In fact, any method of forming a mold can be used in the present invention.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, a silicone-containing (or siloxane-containing) vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group (preferably a bis(trimethylsilyloxy)-alkylsilyl group) or a tris(trialkylsilyloxy)silyl group (preferably a tris(trimethylsilyloxy)silyl group), polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred siloxane-containing vinylic monomers each having a bis(trialkylsilyloxy)alkylsilyl group or a tris(trialkylsilyloxy)silyl group include without limitation tris(trimethylsilyloxy)-silylpropyl (meth)acrylate, [3-(meth)acryloxy-2-hydroxypropyloxy]propyl-bis(trimethylsiloxy)-methylsilane, [3-(meth)acryloxy-2-hydroxypropyloxy]propylbis(trimethyl-siloxy)butylsilane, 3-(meth)acryloxy-2-(2-hydroxyethoxy)-propyloxy)propylbis(trimethylsiloxy)-methylsilane, 3-(meth)acryloxy-2-hydroxypropyloxy)propyl-tris(trimethylsiloxy)silane, N-[tris(trimethylsiloxy)-silylpropyl]-(meth)acrylamide, N-(2-hydroxy-3-(3-(bis(trimethylsilyloxy)-methylsilyl)propyloxy)-propyl)-2-methyl (meth)acrylamide, N-(2-hydroxy-3-(3-(bis(trimethyl-silyloxy)methylsilyl)-propyloxy)propyl) (meth)acrylamide, N-(2-hydroxy-3-(3-(tris(trimethyl-silyloxy)silyl)propyloxy)-propyl)-2-methyl acrylamide, N-(2-hydroxy-3-(3-(tris(trimethylsilyloxy)-silyl)propyloxy)propyl) (meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethyl-ethylsiloxy)silylpropyl] (meth)acrylamide, N,N-bis[2-hydroxy-3-(3-(bis(trimethyl-silyloxy)methyl-silyl)propyloxy)propyl]-2-methyl (meth)acrylamide, N,N-bis[2-hydroxy-3-(3-(bis(trimethylsilyloxy)-methylsilyl)propyloxy)-propyl] (meth)acrylamide, N,N-bis[2-hydroxy-3-(3-(tris(trimethylsilyloxy)-silyl)propyloxy)propyl]-2-methyl (meth)acrylamide, N,N-bis[2-hydroxy-3-(3-(tris(trimethylsilyloxy)-silyl)propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethyl-silyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827.

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxy-ethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylamino-propyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamido-propyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamido-butyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxy-propyl] terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamido-propyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,166,236, 6,867,245, 8,415,405, 8,475,529, 8,614,261, 9,217,813, and 9,315,669, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

In accordance with the invention, any polysiloxane vinylic crosslinkers can be used in this invention. Examples of preferred polysiloxane vinylic crosslinkers include without limitation α,ω-(meth)acryloxy-terminated polydimethylsiloxanes of various molecular weight; α, ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxy-propyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with di-amino-terminated polydimethylsiloxanes; the reaction products of glycidyl methacrylate with di-hydroxyl-terminated polydimethylsiloxanes; the reaction products of an azlactone-containing vinylic monomer (any one of those described above) with di-hydroxyl-terminated polydimethylsiloxanes; the reaction products of isocyantoethyl (meth)acrylate with di-hydroxyl-terminated polydimethylsiloxanes; the reaction products of isocyantoethyl (meth)acrylate with di-amino-terminated polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are vinylic crosslinkers which are prepared by: reacting glycidyl (meth)acrylate or (meth)acryloyl chloride with a di-amino-terminated polydimethylsiloxane or a di-hydroxyl-terminated polydimethylsiloxane; reacting isocyantoethyl (meth)acrylate with di-hydroxyl-terminated polydimethylsiloxanes; reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide); or reacting a hydroxyl-containing acrylic monomer with a di-hydroxy-terminated polydisiloxane in the presence of a diisocyanate or di-epoxy coupling agent.

Examples of such preferred polysiloxane vinylic crosslinkers are α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxy-propyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxy-propyl]-terminated polydimethylsiloxane, α,ω-bis[3-(meth)acrylamidopropyloxy-2-hydroxy-propyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethyl-amino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, and combinations thereof.

Another class of preferred polysiloxane vinylic crosslinkers are chain-extended polysiloxane vinylic crosslinkers each of which comprises at least two polysiloxane segments and can be prepared according to the procedures described in U.S. Pat. Nos. 5,034,461, 5,416,132, 5,449,729, 5,760,100, 7,423,074, 8,529,057, 8,835,525, 8,993,651, and 10301451 and in U.S. Pat. App. Pub. No. 2018-0100038 A1.

A further class of preferred polysiloxane vinylic crosslinkers are hydrophilized polysiloxane vinylic crosslinkers that each comprise at least about 1.50 (preferably at least about 2.0, more preferably at least about 2.5, even more preferably at least about 3.0) milliequivalent/gram ("meq/g") of hydrophilic moieties, which preferably are hydroxyl groups (—OH), carboxyl groups (—COOH), amino groups (—$NHR_{N1}$ in which $R_{N1}$ is H or $C_1$-$C_2$ alkyl), amide moieties (—CO—$NR_{N1}R_{N2}$ in which $R_{N1}$ is H or $C_1$-$C_2$ alkyl and $R_{N2}$ is a covalent bond, H, or $C_1$-$C_2$ alkyl), N—$C_1$-$C_3$ acylamino groups, urethane moieties (—NH—CO—O—), urea moieties (—NH—CO—NH—), a polyethylene glycol chain of

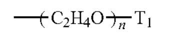

in which n is an integer of 2 to 20 and $T_1$ is H, methyl or acetyl or a phosphorylcholin group, or combinations thereof.

Examples of such preferred hydrophilized polysiloxane vinylic crosslinkers are those compounds of formular (1)

(1)

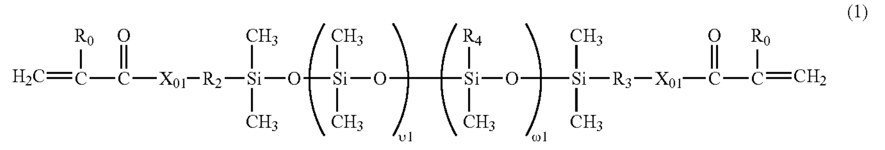

in which:

υ1 is an integer of from 30 to 500 and ω1 is an integer of from 1 to 75, provided that ω1/υ1 is from about 0.035 to about 0.15 (preferably from about 0.040 to about 0.12, even more preferably from about 0.045 to about 0.10);

$X_{01}$ is O or $NR_n$ in which $R_n$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (7)

(2)

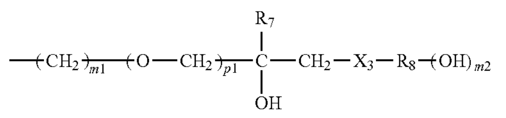

(3)

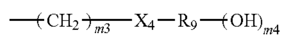

(4)

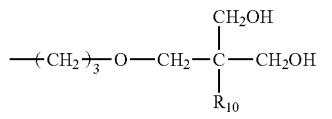

(5)

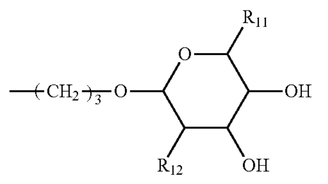

(6)

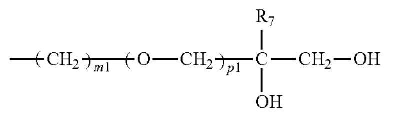

(7)

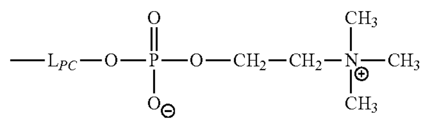

p1 is zero or 1; m1 is an integer of 2 to 4; m2 is an integer of 1 to 5; m3 is an integer of 3 to 6; m4 is an integer of 2 to 5;

$R_7$ is hydrogen or methyl;

$R_8$ is a $C_2$-$C_6$ hydrocarbon radical having (m2+1) valencies;

$R_9$ is a $C_2$-$C_6$ hydrocarbon radical having (m4+1) valencies;

$R_{10}$ is ethyl or hydroxymethyl;

$R_{11}$ is methyl or hydromethyl;

$R_{12}$ is hydroxyl or methoxy;

$X_3$ is a sulfur linkage of —S— or a tertiary amino linkage of —$NR_{13}$— in which $R^{13}$ is $C_1$-$C_1$ alkyl, hydroxyethyl, hydroxypropyl, or 2,3-dihydroxypropyl;

$X_4$ is an amide linkage of

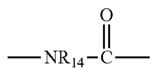

or

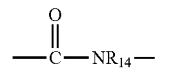

in which $R^{14}$ is hydrogen or $C_1$-$C_{10}$ alkyl;

$L_{PC}$ is a divalent radical of

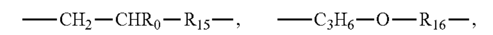

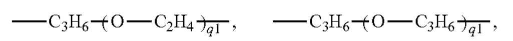

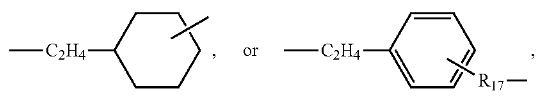

in which q1 is an integer of 1 to 20, $R_{15}$ is a linear or branched $C_1$-$C_{10}$ alkylene divalent radical, $R_{16}$ is a linear or branched $C_3$-$C_{10}$ alkylene divalent radical, and $R_{17}$ is a direct bond or a linear or branched $C_1$-$C_4$ alkylene divalent radical.

The procedures for preparing a polysiloxane vinylic crosslinkers of formula (1) have been described in detail in U.S. Pat. No. 10,081,697 and U.S. Pat. Appl. Pub. No. 2022/0251302 A1.

In accordance with the invention, any carboxyl-containing vinylic monomer can be used in the invention. Examples of carboxyl-containing (meth)acryloxy monomers include without limitation acrylic acid, methacrylic acid, ethylacrylic acid, propyacrylic acid, (meth)acryloyloxy-acetic acid, mono-2-[(meth)acryloyloxy]ethyl succinate, (meth) acryloyloxypropanoic acid, (meth)acryloyloxybutanoic acid, and combinations thereof Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth) acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)

ethyl (meth)acrylamide having a number average molecular weight of up to 1500, and combinations thereof.

Examples of preferred N-vinyl amide monomers include without limitation N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth) acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth) acryloyloxy)propyl-2'-(trimethylammonio)ethylphosphate), 4-((meth)acryloyloxy)butyl-2'-(trimethylammonio)ethylphosphate. 2-[(meth)acryloylamino]ethyl-2'-(trimethylammonio)-ethylphosphate. 3-[(meth)acryloylamino]propyl-2'-(trimethylammonio)ethylphosphate, 4-[(meth) acryloylamino]butyl-2'-(trimethylammonio)ethylphosphate. 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth) acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy) ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, polyethylene glycol di-(meth)acrylate having a number averaged molecular weight of from 200 to 10,000 daltons, glycerol di-(meth) acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth) acryloxyethyl] phosphate, trimethylolpropane di-(meth) acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth) acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), triallyl isocyanurate, triallyl cyanurate, and combinations thereof, more preferably selected from the group consisting of ethyleneglycol di-(meth)acrylate, diethyleneglycol di-(meth)acrylate, triethyleneglycol di-(meth)acrylate, tetraethyleneglycol di-(meth) acrylate, polyethylene glycol di-(meth)acrylate having a number averaged molecular weight of from 200 to 10,000 daltons, and combinations thereof.

In accordance with the invention, a free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide.

A SiHy lens formulation (i.e., a polymerizable composition) can also comprise other necessary components known to a person skilled in the art, such as, for example, one or more non-silicone hydrophobic vinylic monomers, a UV-absorbing vinylic monomer, a polymerizable UV/high-energy-violet-light ("HEVL") absorbing compound (including UV/HEVL absorbing vinylic monomer described below, and/or polymerizable Cu(II)-porphyrins described in U.S. Pat. Appl. Pub. No. 20150316688), a polymerizable photochromic compound, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

In accordance with the invention, any non-silicone hydrophobic hydrophobic vinylic monomers can be in this invention. Examples of preferred non-silicone hydrophobic vinylic monomers include methyl (meth)acrylate, ethyl (meth)acrylate, propyl (meth)acrylate, isopropyl (meth) acrylate, cyclohexyl (meth)acrylate, 2-ethylhexyl (meth) acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth) acrylate, trifluoroethyl (meth)acrylate, hexafluoro-isopropyl (meth)acrylate, hexafluorobutyl (meth)acrylate, and combinations thereof.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole. In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro (indoline)naphthoxazines, polymerizable spiro(indoline)-pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term “solvent” refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, the polymerizable composition comprises: (i) at least one hydrophilized polysiloxane vinylic crosslinker, (ii) optionally but preferably hydroxyethyl methacrylate, (iii) at least one $C_1$-$C_2$ alkoxyethyl (meth)acrylate, (iv) from about 0.5% to about 4% (preferably from about 0.7% to about 3.5%, more preferably from about 0.9% to about 3.0%, even more preferably from about 1.0% to about 2.8%) by weight of at least one carboxyl-containing vinylic monomer relative to the total amount of all polymerizable components, (v) at least one free-radical, and (vi) optionally at least one solvent selected from the group consisting of water, propylene glycol, a polyethyleneglycol having a molecular weight of about 400 Daltons or less, and combinations thereof. The sum of the amounts of components (i) to (v) is at least about 90% by weight, preferably at least about 92% by weight, more preferably at least about 94% by weight, even more preferably at least about 96% by weight relative to the total amount of all polymerizable components in the polymerizable composition. It is understood that according to this preferred embodiment of the invention, the polymerizable composition can further comprise one or more additional polymerizable components (other than components (i) to (v) known to a person skilled in the art, so long as the sum of the amounts of those additional polymerizable component components is about 10% by weight or less, preferably about 8% by weight or less, more preferably about 6% by weight or less, even more preferably about 4% by weight or less, relative to the total amount of all polymerizable components in the polymerizable composition. The polymerizable composition can be prepared by blending all of the desirable components as known to a person skilled in the art.

Also, in accordance with this preferred embodiment, the polymerizable composition comprises: preferably from about 30% to about 65% (more preferably from about 35% to about 60%, even more preferably from about 40% to about 60%) by weight of component (i); preferably from about 30% to about 65% (more preferably from about 35% to about 60%, even more preferably from about 40% to about 60%) by weight of components (ii) and (iii); and preferably from about 2% to about 10% (more preferably from about 3% to about 9%, even more preferably from about 4% to about 8%) by weight of component (iv), relative to the total amount of all polymerizable components.

Further, in accordance with this preferred embodiment, the weight ratio of component (iii) to component (ii) in the polymerizable composition is about 40:10, preferably about 35:15, more preferably about 30:15, even more preferably about 23:11.

In accordance with the invention, the polymerizable composition can be dispensed into the lens mold according to any known techniques. For example, a specific amount of a polymerizable composition is typically dispensed into a female mold half by means of a dispensing device and then a male mold half is put on and the mold is closed. As the mold closes, any excess polymerizable composition is pressed into an overflow provided on the female mold half (or alternatively on the male mold half).

The molding assembly (i.e., the closed mold containing the polymerizable composition) is subsequently cured thermally or actinically, as known to a person skilled in the art, to form a silicone hydrogel lens precursor comprising a bulk silicone hydrogel material that comprises carboxyl groups. It is understood that carboxyl groups on and/or near the surface of the bulk silicone hydrogel material can serve as reactive sites at which a layer of a crosslinked hydrophilic polymeric material can be covalently attached.

After curing, the molds can be opened according to any techniques known to a person skilled in the art. After the mold is separated, the silicone hydrogel lens precursor adheres to one of the male and female mold halves.

The silicone hydrogel lens precursor adhered on the lens-adhered mold half can be removed from the lens-adhered mold half and then subject to one or more post molding processes.

In accordance with the invention, a water-soluble and thermally-crosslinkable hydrophilic polymeric material preferably comprises azetidinium groups or epoxy groups or combinations thereof. Preferably, the water-soluble and crosslinkable hydrophilic polymeric material is a partially-crosslinked polymeric material that comprises a three-dimensional network and thermally-crosslinkable groups, preferably azetidinium groups, within the network or being attached to the network. The term "partially-crosslinked" in reference to a polymeric material means that the crosslinkable groups of starting materials for making the polymeric material in crosslinking reaction have not been fully consumed. For example, such a thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme I

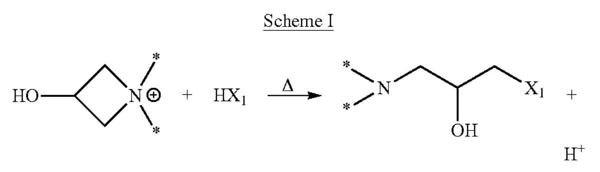

in which $X_1$ is —S—*, —OC(═O)—*, or —NR'—* in which R' is hydrogen or a $C_1$-$C_{20}$ unsubstituted or substituted alkyl group, and * represents an organic radical.

Examples of preferred water-soluble and thermally-crosslinkable hydrophilic polymeric materials comprising epoxy groups include without limitation: one or more multi-armed polyethylene glycols each having terminal epoxy groups; a mixture of a multi-armed polyethylen glycol having terminal epoxy group and one or more polyethylene glycol each having terminal functional groups selected from the group consisting of primary amine groups, secondary amine groups, carboxyl groups, thiol groups, and combinations thereof; a partial reaction product of a multi-armed polyethylene having terminal epoxy groups and a hydrophilicity-enhancing agent having at least one reactive functional group selected from the group consisting of amino group, carboxyl group, thiol group, and combination thereof (as disclosed in U.S. Pat. No. 9,505,184, hydrophilic polymers disclosed in U.S. Pat. No. 6,440,571), or combinations thereof.

Examples of preferred water-soluble and thermally-crosslinkable hydrophilic polymeric materials comprising azetidinium groups include without limitation poly(2-oxazoline-co-ethyleneimine)-epichlorohydrin copolymers which are disclosed in U.S. Pat. No. 9,720,138, chemically-modified poly(2-oxazoline-co-ethyleneimine)-epichlorohydrin copolymers which are disclosed in U.S. Pat. No. 9,720,138, chemically-modified polyamidoamine-epichlorohydrins as disclosed in U.S. Pat. No. 8,529,057, copolymers of an azetidinium-containing vinylic monomer with one or more hydrophilic vinylic monomers disclosed in U.S. Pat. No. 9,422,447, chemically-modified copolymers of an azetidinium-containing vinylic monomer with one or more hydrophilic vinylic monomers disclosed in U.S. Pat. No. 9,422,447, or combinations thereof.

In accordance with the invention, the term "chemically-modified" in reference with a water-soluble and thermally crosslinkable hydrophilic polymeric material having azetidinium groups means that a poly(2-oxazoline-co-ethyleneimine)-epichlorohydrin copolymer, a polyamidoamine-epichlorohydrin or a copolymer of an azetidinium-containing vinylic monomer is reacted partially (i.e., not consuming all of the azetidinium groups) with a hydrophilicity-enhancing agent having at least one reactive functional group selected from the group consisting of amino group, carboxyl group, thiol group, and combination thereof. A chemically-modified poly(2-oxazoline-co-ethyleneimine)-epichlorohydrin copolymer or polyamidoamine-epichlorohydrin or copolymer of an azetidinium-containing vinylic monomer can be especially useful for forming relatively-thick and soft non-silicone hydrogel coatings on silicone hydrogel contact lenses.

Any suitable hydrophilicity-enhancing agents can be used in the invention so long as they contain at least one amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-ß-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH)

groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units,

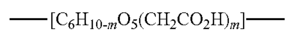

in which m is 1 to 3), carboxyethylcellulose (having a carboxyl content of about 36% or less, which is estimated based on the composition of repeating units,

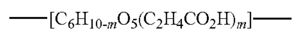

in which m is 1 to 3) carboxypropylcellulose (having a carboxyl content of about 32% or less, which is estimated based on the composition of repeating units,

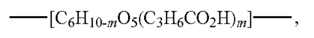

in which m is 1 to 3), hyaluronic acid (having a carboxyl content of about 11%, which is estimated based on the composition of repeating units,

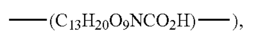

chondroitin sulfate (having a carboxyl content of about 9.8%, which is estimated based on the composition of repeating units,

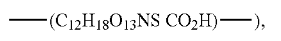

or combinations thereof.

Another preferred class of hydrophilic polymers as hydrophilicity-enhancing agents include without limitation: poly (ethylene glycol) (PEG) with mono-amino (primary or secondary amino), carboxyl or thiol group (e.g., PEG-$NH_2$, PEG-SH, PEG-COOH); $H_2$N-PEG-$NH_2$; HOOC-PEG-COOH; HS-PEG-SH; $H_2$N-PEG-COOH; HOOC-PEG-SH; $H_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino-(primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

In accordance with the invention, reactive vinylic monomers for making hydrophilicity-enhancing agents can be carboxyl-containing vinylic monomers, primary amino-containing vinylic monomers, or secondary amino-containing vinylic monomers. Examples of preferred carboxyl-containing vinylic monomers include without limitation acrylic acid, methacrylic ethylacrylic acid, N-2-(meth)acrylamidoglycolic acid, and combinations thereof. Examples of preferred primary and secondary amino-containing vinylic monomers include without limitation N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, and combinations thereof.

In accordance with the invention, a non-reactive vinylic monomer for making hydrophilicity-enhancing agents is a vinylic monomer free of any carboxyl group, primary amino group, secondary amino group, epoxide group, isocyanate group, azlactone group, or aziridine group. Non-reactive vinylic monomers preferably are non-charged hydrophilic vinylic monomers which are free of carboxyl or amino group (any those described above can be used here), phosphorylcholine-containing vinylic monomers (any those described above can be used here), or combinations thereof.

More preferably, a hydrophilic polymer as a hydrophilicity-enhancing agent is:

- a poly(ethylene glycol) having one sole functional group of —$NH_2$, —SH or —COOH;
- a poly(ethylene glycol) having two terminal functional groups selected from the group consisting of —$NH_2$, —COOH, —SH, and combinations thereof;
- a multi-arm poly(ethylene glycol) having one or more functional groups selected from the group consisting of —$NH_2$, —COOH, —SH, and combinations thereof;
- a monoamino-, monocarboxyl-, diamino- or dicarboxyl-terminated homo- or copolymer of a non-reactive hydrophilic vinylic monomer;
- a copolymer which is a polymerization product of a composition comprising (1) from about 0.1% to about 30%, preferably from about 0.5% to about 20%, more preferably from about 1% to about 15%, by weight of a reactive vinylic monomer and (2) at least one non-reactive vinylic monomer, Examples of preferred reactive vinylic monomers include without limitation acrylic acid, methacrylic acid, ethylacrylic acid, 2-(meth)acrylamidoglycolic acid, N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-amino-2-hydroxypropyl (meth)acrylate, and combinations thereof.

Example of preferred non-reactive hydrophilic vinylic monomers include without limitation alkyl (meth)acrylamides (any one described above), N-2-dimethylaminoethyl (meth)acrylamide, dimethylaminoethyl (meth)acrylate, hydroxyl-containing acrylic monomers (any one described above), N-vinyl amide monomers (any one described above), methylene-containing pyrrolidone monomers (i.e., pyrrolidone derivatives each having a methylene group connected to the pyrrolidone ring at 3- or 5-position) (any one described above), acrylic monomers having a $C_1$-$C_4$ alkoxyethoxy group (any one described above), vinyl ether monomers (any one described above), allyl ether monomers (any one described above), a phosphorylcholine-containing vinylic monomer (any one described above), and combinations thereof.

Preferably, the non-reactive hydrophilic vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethyl-phosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), tetra(ethylene glycol) (meth) acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol) methyl vinyl ether, poly (ethylene glycol) methyl vinyl ether, tetra(ethylene glycol) monoallyl ether, poly(ethylene glycol) monoallyl ether, tetra (ethylene glycol) methyl allyl ether, poly(ethylene glycol) methyl allyl ether, vinyl alcohol, allyl alcohol, and combinations thereof, more preferably selected from the group consisting of (meth)acryloyloxyethyl phosphorylcholine, (meth)acryloyloxypropyl phosphorylcholine, 4-((meth) acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly(ethylene glycol) methyl vinyl ether, poly(ethylene glycol) monoallyl ether, poly (ethylene glycol) methyl allyl ether, vinyl alcohol, allyl alcohol, and combinations thereof, even more preferably selected from the group consisting of (meth)acryloyloxyethyl phosphorylcholine, (meth)acryloyloxypropyl phosphorylcholine, 2-[(meth)acryloylamino]ethyl-2'-(trimethylammonio)ethylphosphate, 3-[(meth)acryloylamino]propyl-2'-(trimethylammonio)ethylphosphate, (meth)acrylamide, dimethyl (meth)acrylamide, N-2-hydroxyethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, poly(ethylene glycol)ethyl (meth) acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, and combinations thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or copolymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOP Corporation (e.g., LIPIDURE®-AC01, and AE).

The weight average molecular weight Mw of the hydrophilic polymer having at least one amino, carboxyl or thiol group (as a hydrophilicity-enhancing agent) is preferably from about 500 to about 2,000,000, more preferably from about 1,000 to about 500,000, even more preferably from about 5,000 to about 250,000 Daltons.

Water-soluble and thermally-crosslinkable hydrophilic polymeric materials can be prepared according to the processes disclosed in U.S. Pat. Nos. 8,529,057, 9,422,447, 9,720,138, and 11256003.

In a preferred embodiment, a water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of amino group, carboxyl group, thiol group, and a combination thereof, to a temperature of from about 35° C. to about 85° C. and maintaining the temperature for a period of time sufficient (about 8 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, $NH_4OH$, or mixture thereof) or an acid (e.g., HCl, $H_2SO_4$, $H_3PO_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. $NaH_2PO_4$, $Na_2HPO_4$, $Na_3PO_4$, $KH_2PO_4$, $K_2HPO_4$, $K_3PO_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., $Na_2CO_3$, $NaHCO_3$, $K_2CO_3$, $KHCO_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 m1 of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl or thiol groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent.

In accordance with the invention, the step of heating is performed preferably by autoclaving the silicone hydrogel lens precursor immersed in a packaging solution (i.e., a buffered aqueous solution) in a sealed lens package at a temperature of from about 115° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably from about 6.8 to about 8.5, more preferably from about 7.0 to 8.2, even more preferably from about 7.2 to about 8.0. It is found that a higher pH is desirable for ensuring that all or a significant portion of the carboxyl groups of the bulk silicone hydrogel material are ionized. As a result, the resultant silicone hydrogel contact lenses become dimensionally stable in the packaging solution during autoclave and storage and can have improved lubricity.

Any known, physiologically compatible buffering agents can be used. Suitable buffering agents as a constituent of the contact lens care composition according to the invention are known to a person skilled in the art. Preferably, a phosphate buffer (consisting essentially of a mixture of a monobasic dihydrogen phosphate (e.g., $NaH_2PO_4$, $KH_2PO_4$, or mixtures thereof) and dibasic monohydrogen phosphate (e.g., $Na_2HPO_4$, $K_2HPO_4$, or mixtures thereof) are used for maintaining the pH of the packaging solution. In various preferred embodiments, the total concentration of the monobasic dihydrogen phosphate and the dibasic monohydrogen phosphate is at least 30 mM (preferably at least 35 mM, more preferably at least 40 mM, even more preferably at least 45 mM).

The solutions according to the invention are preferably formulated in such a way that they are isotonic with the lachrymal fluid. A solution which is isotonic with the lachrymal fluid is generally understood to be a solution whose concentration corresponds to the concentration of a 0.9% sodium chloride solution (308 mOsm/kg). Deviations from this concentration are possible throughout.

The isotonicity with the lachrymal fluid, or even another desired tonicity, may be adjusted by adding organic or inorganic substances that affect the tonicity. Suitable ocularly acceptable tonicity agents include, but are not limited to sodium chloride, potassium chloride, glycerol, propylene glycol, polyols, mannitols, sorbitol, xylitol and mixtures thereof. The tonicity of the packaging solution is typically adjusted to be from about 200 to about 450 milliosmol (mOsm), preferably from about 250 to 350 mOsm.

In a preferred embodiment, one or more organic tonicity agents (e.g., glycerol, propylene glycol, polyethylene glycol having a number average molecular weigh of from 200 to 800 daltons), mannitols, sorbitol, xylitol, and mixtures thereof) are is present in an amount of at least 70 mM (preferably at least 90 mM, more preferably at least 110 mM, even more preferably at least 130 mM) for adjusting the tonicity of the packaging solution. It is found that the resultant silicone hydrogel contact lenses can have improved lubricity when the ionic strength of the packaging solution is lowered (e.g., by replacing a portion of NaCl with an organic tonicity agent, e.g., propylene glycol).

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing coated silicone hydrogel contact lenses, comprising the steps of:
   (1) obtaining a lens mold made of a hydrophobic plastic material, wherein the lens mold comprises a first mold half having a first molding surface and a second mold half having a second molding surface;
   (2) treating the first and second molding surfaces by using a vacuum UV or a corona treatment (i.e., increasing surface energies of the first and second molding surfaces by treating them with a vacuum UV or a corona plasma)
   (3) introducing a polymerizable composition into the lens mold obtained in step (2), wherein the polymerizable composition comprises (a) at least one polysiloxane vinylic crosslinker and/or at least one siloxane-containing vinylic monomer, (b) from about 0.5% to about 4% by weight of at least one carboxyl-containing vinylic monomer relative to the total amount of all polymerizable components, (c) at least one hydrophilic vinylic monomer, (d) optionally but preferably at least one non-silicone vinylic crosslinker, and (e) at least one free-radical;
   (4) curing thermally or actinically the polymerizable composition in the lens mold to form a silicone hydrogel lens precursor comprising a bulk silicone hydrogel material that comprises carboxyl groups;
   (5) optionally hydrating the silicone hydrogel lens precursor obtained in step (4) in water or an aqueous solution to obtain a hydrated silicone hydrogel contact lens; and
   (6) heating the silicone hydrogel lens precursor obtained in step (4) or the hydrated silicone hydrogel contact lens obtained in step (5) directly in an aqueous solution having a pH from about 6.5 to about 9.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material, wherein the coated silicone hydrogel contact lens in fully-hydrated state exhibits a water-break-up-time (WBUT) of at least 10 seconds (preferably at least 15 seconds, more preferably at least 20 seconds, even more preferably at least 25 seconds) and an oxygen permeability of at least 50 barrers (preferably at least 60 barrers, more preferably at least 70 barrers, even more preferably at least 80 barrers).

2. The method of embodiment 1, wherein the polymerizable composition comprises from about 0.7% to about 3.5% by weight of at least one carboxyl-containing vinylic monomer relative to the total amount of all polymerizable components.
3. The method of embodiment 1, wherein the polymerizable composition comprises from about 0.9% to about 3.0% by weight of at least one carboxyl-containing vinylic monomer relative to the total amount of all polymerizable components.
4. The method of embodiment 1, wherein the polymerizable composition comprises from about 1.0% to about 2.8% by weight of at least one carboxyl-containing vinylic monomer relative to the total amount of all polymerizable components.
5. The method of any one of embodiments 1 to 4, wherein said at least one carboxyl-containing vinylic monomer is selected from the group consisting of acrylic acid, methacrylic acid, ethylacrylic acid, propyacrylic acid, (meth)acryloyloxyacetic acid, mono-2-[(meth)acryloyloxy]ethyl succinate, (meth)acryloyloxypropanoic acid, (meth)acryloyloxybutanoic acid, and combinations thereof.
6. The method of any one of embodiments 1 to 5, wherein the polymerizable composition comprises from about 30% to about 65% by weight of component (a), relative to the total amount of all polymerizable components.
7. The method of any one of embodiments 1 to 6, wherein the polymerizable composition comprises from about 30% to about 65% by weight of component (c), relative to the total amount of all polymerizable components.
8. The method of any one of embodiments 1 to 7, wherein the sum of the amounts of components (a) to (e) is at least about 85% by weight, relative to the total amount of all polymerizable components in the polymerizable composition.
9. The method of embodiment 8, wherein the polymerizable composition further comprises one or more polymerizable components selected from the group consisting of a non-silicone hydrophobic vinylic monomer, a UV-absorbing vinylic monomer, a polymerizable UV/high-energy-violet-light absorbing compound, a polymerizable photochromic compound, a polymerizable tinting agent, and combinations thereof.
10. The method of any one of embodiments 1 to 9, wherein the polymerizable composition comprises (a) at least one hydrophilized polysiloxane vinylic crosslinker, (b) said at least one carboxyl-containing (meth) acryloxy monomer, (c) hydroxyethyl methacrylate and at least one $C_1$-$C_2$ alkoxyethyl (meth)acrylate, (d) said at least one non-silicone vinylic crosslinker, (e) said at least one free-radical, and (f) at least one solvent selected from the group consisting of water, propylene glycol, a polyethyleneglycol having a molecular weight of about 400 Daltons or less, and combinations thereof
11. The method of embodiment 9, wherein the weight ratio of said at least one $C_1$-$C_2$ alkoxyethyl (meth) acrylate to hydroxyethyl methacrylate in the polymerizable composition is about 40 to about 20.
12. The method of embodiment 10 or 11, wherein said at least one hydrophilized polysiloxane vinylic crosslinker comprises at least about 1.50 milliequivalent/gram ("meq/g") of hydrophilic moieties, which preferably are hydroxyl groups (—OH), carboxyl groups (—COOH), amino groups (—$NHR_{N1}$ in which $R_{N1}$ is H or $C_1$-$C_2$ alkyl), amide moieties (—CO—$NR_{N1}R_{N2}$ in which $R_{N1}$ is H or $C_1$-$C_2$ alkyl and $R_{N2}$ is a covalent bond, H, or $C_1$-$C_2$ alkyl), N—$C_1$-$C_3$ acylamino groups, urethane moieties (—NH—CO—O—), urea moieties (—NH—CO—NH—), a polyethylene glycol chain of

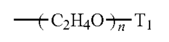

in which n is an integer of 2 to 20 and $T_1$ is H, methyl or acetyl or a phosphorylcholine group, or combinations thereof.
13. The method of any one of embodiments 10 to 12, wherein said at least one hydrophilized polysiloxane vinylic crosslinker is a polysiloxane vinylic crosslinker that comprises (1) a polysiloxane segment comprising dimethylsiloxane units and hydrophilized siloxane units each having one methyl substituent and one monovalent $C_4$-$C_{40}$ organic radical substituent having 2 to 6 hydroxyl groups and (2) two terminal (meth) acryloyl groups.
14. The method of embodiment 13, wherein said at least one hydrophilized polysiloxane vinylic crosslinker comprises a polysiloxane vinylic crosslinker of formula (1)

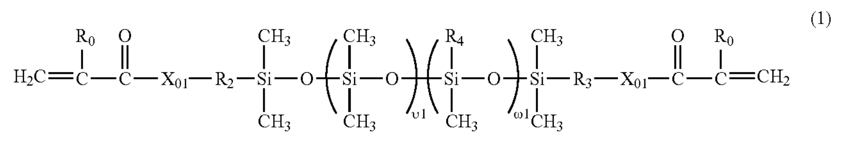

(1)

in which:

υ1 is an integer of from 30 to 500 and ω1 is an integer of from 1 to 75, provided that ω1/υ1 is from about 0.035 to about 0.15;

$X_{01}$ is O or $NR_n$ in which $R_n$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (7)

(2)

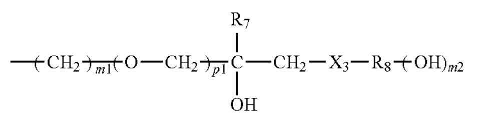

(3)

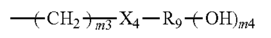

(4)

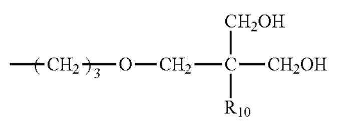

(5)

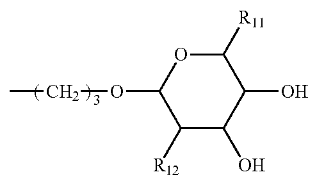

(6)

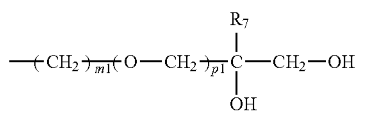

(7)

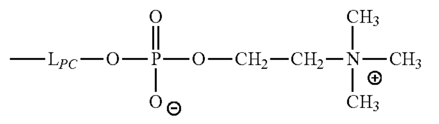

p1 is zero or 1; m1 is an integer of 2 to 4; m2 is an integer of 1 to 5; m3 is an integer of 3 to 6; m4 is an integer of 2 to 5;

$R_7$ is hydrogen or methyl;

$R_8$ is a $C_2$-$C_6$ hydrocarbon radical having (m2+1) valencies;

$R_9$ is a $C_2$-$C_6$ hydrocarbon radical having (m4+1) valencies;

$R_{10}$ is ethyl or hydroxymethyl;

$R_{11}$ is methyl or hydromethyl;

$R_{12}$ is hydroxyl or methoxy;

$X_3$ is a sulfur linkage of —S— or a tertiary amino linkage of —$NR_{13}$— in which $R_{13}$ is $C_1$-$C_1$ alkyl, hydroxyethyl, hydroxypropyl, or 2,3-dihydroxypropyl;

$X_4$ is an amide linkage of

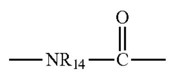

or

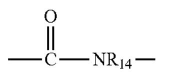

in which $R^{14}$ is hydrogen or $C_1$-$C_{10}$ alkyl;

$L_{PC}$ is a divalent radical of

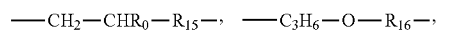

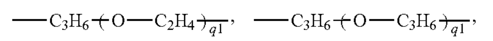

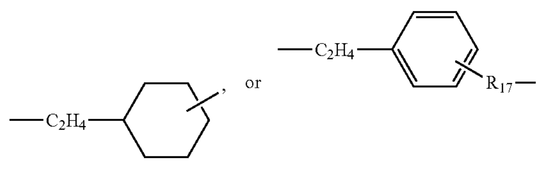

in which q1 is an integer of 1 to 20, $R^{15}$ is a linear or branched $C_1$-$C_{10}$ alkylene divalent radical, $R^{16}$ is a linear or branched $C_3$-$C_{10}$ alkylene divalent radical, and $R^{17}$ is a direct bond or a linear or branched $C_1$-$C_4$ alkylene divalent radical.

15. The method of any one of embodiments 1 to 14, wherein the step of heating is performed preferably by autoclaving the silicone hydrogel lens precursor immersed in a packaging solution (i.e., a buffered aqueous solution) in a sealed lens package at a temperature of from about 115° C. to about 125° C. for approximately 20-90 minutes.

16. The method of any one of embodiments 1 to 15, wherein said at least one water-soluble and thermally crosslinkable hydrophilic polymeric material comprises azetidinium groups, epoxy groups or combinations thereof.

17. The method of embodiment 16, wherein said at least one water-soluble and thermally crosslinkable hydrophilic polymeric material is a three-dimensional network and thermally-crosslinkable groups within the network or being attached to the network.

18. The method of embodiment 16, wherein said at least one water-soluble and thermally crosslinkable hydrophilic polymeric material is: one or more multi-armed polyethylene glycols each having terminal epoxy groups; a mixture of a multi-armed polyethylen glycol having terminal epoxy group and one or more polyethylene glycol each having terminal functional groups selected from the group consisting of primary amine groups, secondary amine groups, carboxyl groups, thiol groups, and combinations thereof; a partial reaction product of a multi-armed polyethylene having terminal epoxy groups and a hydrophilicity-enhancing agent having at least one reactive functional group selected from the group consisting of amino group, carboxyl group, thiol group; or combinations thereof.

19. The method of embodiment 16, wherein said at least one water-soluble and thermally crosslinkable hydrophilic polymeric material comprises azetidinium groups and is a partial reaction product of an azetidinium-containing polymer and a hydrophilicity-enhancing agent having at least one reactive functional group selected from the group consisting of a primary amine group, a secondary amine group, a carboxyl group, a thiol group, and combinations thereof.

20. The method of embodiment 19, wherein the azetidinium-containing polymer is a poly(2-oxazoline-co-ethyleneimine)-epichlorohydrin copolymer, a polyamidoamine-epichlorohydrin, a copolymer of an azetidinium-containing vinylic monomer with one or more hydrophilic vinylic monomers, or combinations thereof.

21. The method of embodiment 19 or 20, wherein the hydrophilicity-enhancing agent is: a primary amino-, secondary amino-, carboxyl- or thiol-containing monosaccharide; a primary amino-, secondary amino-, carboxyl- or thiol-containing disaccharide; a primary amino-, secondary amino-, carboxyl- or thiol-containing oligosaccharide; or combinations thereof.
22. The method of embodiment 19 or 20, wherein the hydrophilicity-enhancing agent is a hydrophilic polymer having one or more primary or secondary amino groups, one or more carboxyl groups, one or more thiol groups, or combinations thereof.
23. The method of embodiment 22, wherein the hydrophilicity-enhancing agent is a polysaccharide having primary amine groups, secondary amine groups, carboxyl groups, or combinations thereof.
24. The method of embodiment 22, wherein the hydrophilicity-enhancing agent is:
   a poly(ethylene glycol) having one sole functional group of —$NH_2$, —SH or —COOH;
   a poly(ethylene glycol) having two terminal functional groups selected from the group consisting of —$NH_2$, —COOH, —SH, and combinations thereof;
   a multi-arm poly(ethylene glycol) having one or more functional groups selected from the group consisting of —$NH_2$, —COOH, —SH, and combinations thereof;
   a monoamino-, monocarboxyl-, diamino- or dicarboxyl-terminated homo- or copolymer of a non-reactive hydrophilic vinylic monomer;
   a copolymer which is a polymerization product of a composition comprising (1) from about 0.1% to about 30% (preferably from about 0.5% to about 20%, more preferably from about 1% to about 15%) of a reactive vinylic monomer and (2) at least one non-reactive hydrophilic vinylic monomer,
   wherein the reactive vinylic monomer is a vinylic monomer having a functional group selected from the group consisting of carboxyl group, a primary amine group, and a secondary amine group,
   wherein the non-reactive hydrophilic monomer is a hydrophilic vinylic monomer free of any free of any carboxyl group, primary amine group, secondary amine group, epoxide group, isocyanate group, azlactone group, or aziridine group.
25. The method of embodiment 24, wherein the reactive vinylic monomer is acrylic acid, methacrylic acid, ethylacrylic acid, 2-(meth)acrylamidoglycolic acid, N-2-aminoethyl (meth)acrylamide, N-2-methylaminoethyl (meth)acrylamide, N-2-ethylaminoethyl (meth) acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-amino-2-hydroxypropyl (meth)acrylate, or a combination thereof.
26. The method of embodiments 24 or 25, wherein the non reactive hydrophilic vinylic monomer is selected from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof,
   wherein the non-reactive hydrophilic vinylic monomer selected from the group consisting of selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth) acryloylamino]butyl-2'-(trimethylammonio) ethylphosphate, (meth)acrylamide, dimethyl (meth) acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, 2-hydroxyethyl (meth)acrylate, glycerol methacrylate (GMA), tetra (ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly (ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly (ethylene glycol) monovinyl ether, tetra(ethylene glycol) methyl vinyl ether, poly(ethylene glycol) methyl vinyl ether, tetra(ethylene glycol) monoallyl ether, poly(ethylene glycol) monoallyl ether, tetra (ethylene glycol) methyl allyl ether, poly(ethylene glycol) methyl allyl ether, vinyl alcohol, allyl alcohol, and combinations thereof.
27. The method of any one of embodiments 1 to 26, wherein the aqueous solution has a pH of from about 7.0 to about 8.2, wherein the aqueous solution comprises from about 0.01% to about 2% (preferably from about 0.05% to about 1.5%, more preferably from about 0.1% to about 1%, even more preferably from about 0.2% to about 0.5%) by weight of said at least one water-soluble thermally-crosslinkable hydrophilic polymeric material.
28. The method of any one of embodiments 1 to 27, wherein the aqueous solution comprises a mixture of a monobasic dihydrogen phosphate and dibasic monohydrogen phosphate for maintaining the pH of the aqueous solution, wherein the total concentration of the monobasic dihydrogen phosphate and the dibasic monohydrogen phosphate is at least 30 mM.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability (Dk; or Dkc) of a lens and a lens material are determined according to procedures described in ISO 18369-4.

Water Break-Up Time (WBUT) Tests

The surface hydrophilicity of lenses is assessed by determining the time required for the water film to start breaking on the lens surface using the interfacial dewetting and drainage optical platform (iDDroP) as described by Bhamla et al. in their article entitled Influence of Lipid Coatings on Surface Wettability Characteristics of Silicone Hydrogels published in Langmuir. 2015, 31:3820-3828. During the IDDrop test, the lens is placed on a stage and submerged in PBS. Then, a small surface of the lens is exposed to air. A motorized linear stage and motion controller are used in order to expose the contact lens at specified depths. Video of the water break-up is captured in order to evaluate water break-up time as well as the pattern in which the water film breaks up.

Equilibrium Water Content

The equilibrium water content (EWC) of contact lenses (i.e., water content of a contact lens in fully hydrated state) are determined according to the procedures described in Example 1 of U.S. Pat. Appl. Pub. No. 20210181379 A1.

Elastic Modulus

The elastic modulus of a contact lens is determined according to the procedures described in Example 1 of U.S. Pat. Appl. Pub. No. 20210181379 A1.

Light Transmissibility

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, PH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. The light transmissibility of a contact lens is the average % transmission between 400 nm and 700 nm.

Water Contact Angle (WCA) Measurements. Water contact angle (WCA) measurements are performed by the sessile drop method with a DSA 10 drop shape analysis system from Krüss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 μl) is then dosed on the lens apex, and the change of the contact angle over time of this water droplet (WCA(t), circle fitting mode) is monitored. The WCA is calculated by the extrapolation of the graph WCA(t) to t=0.

Determination of Lens Diameter of Hydrated Contact Lens

The lens diameters of hydrated contact lenses are determined according to the procedures described in Example 1 of U.S. Pat. Appl. Pub. No. 20210181379 A1.

Lubricity Evaluation.

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity). During this test, a lens is felt between the thumb and forefinger, and is qualitatively given a rating from 0-4 based on the perceived levels of friction by a tester. The rating given is in comparison to 5 commercial lenses that serve as standards for this test, corresponding to the 5 levels of lubricity.

The levels and standards are as follows: the DAILIES® TOTAL1® lens (Alcon) is a standard for a 0 rating on the scale, the ACUVUE® OASYS™ lens (Johnson & Johnson) is a standard rating of 1, the ULTRA® lens (Bausch & Lamb) is a standard rating of 2, the DAILIES® Aqua Comfort Plus® lens (Alcon) is a standard rating of 3, and the AIR OPTIX® Aqua lens is a standard rating of 4.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. When evaluating the lubricity of the anterior surface, the lens is placed on a forefinger with its posterior surface facing the forefinger and the thumb moves against the anterior surface to feel the slipperiness (or lubricity) of the anterior surface. When evaluating the lubricity of the posterior surface, the lens is first inverted and then placed on a forefinger with the inverted anterior surface facing the forefinger, and then the thumb moves against the inverted posterior surface to feel the slipperiness (or lubricity) of the posterior surface.

Each samples are assigned a friction rating relative to the above standard lenses described above. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined directly out-of-pack (OOP) but after ≥30 min soaking in PBS according to the procedures described above.

Chemicals

The following abbreviations are used in the following examples: HEMA represents hydroxyethyl methacrylate; EOEMA represents ethoxyethyl methacrylate; MAA represents methacrylic acid; NaMAA represent sodium salt of methacrylic acid; AA represents acrylic acid; PEG-DA represents poly(ethylene glcol) diacrylate (Mn ~800 g/mol); PG represents propylene glycol; Vazo 67 represents 2,2'-azodi (2-methylbutyronicnitrile); Perkadox 16 is Di(4-tert-butylcyclohexyl) peroxydicarbonate; MPC represents 2-Methacryloyloxyethyl phosphorylcholine; EGMA is 2-methoxyethyl methacrylate; AMA is allyl methacrylate; TEGDVE is tri(ethylene glycol) divinyl ether; Nobloc is 2-[3-(2H-Benzotriazol-2-yl)-5-hydroxyphenyl]ethyl methacrylate; RB247 is Reactive Blue 247; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; "G2" macromer represents a di-methacryloyloxypropyl-terminated polysiloxane (Mn ~8K g/mol, OH content ~3.5 meq/g) of formula (A).

(A)

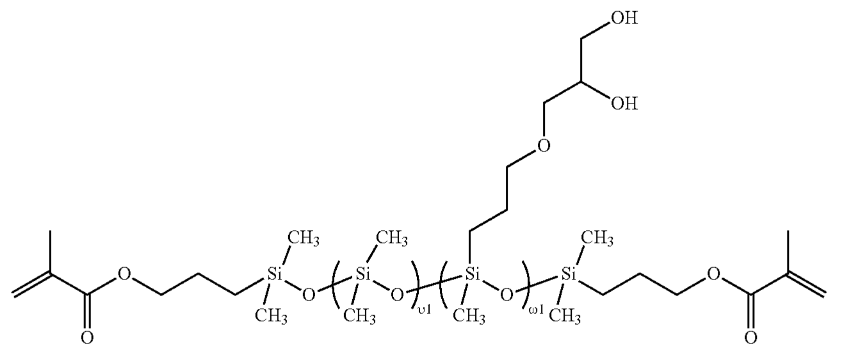

Example 2

Phosphate Buffered Saline (PBS)

A phosphate buffered saline is prepared by dissolving $NaH_2PO_4 \cdot H_2O$, $Na_2HPO_4 \cdot 2H_2O$, and NaCl in a given volume of purified water (distilled or deionized) to have the following composition: ca. 0.044 w/w % $NaH_2PO_4 \cdot H_2O$, ca. 0.388 w/w/% $Na_2HPO_{4} \cdot {}_2H_2O$, and ca. 0.79 w/w % NaCl.

Preparation of in-Package-Coating Saline-IPC-1

IPC saline (IPC-1) is prepared by mixing appropriate amount of Poly(AAm-co-AA) or other wetting agent with PAE in phosphate buffered saline and pre-treated at certain temperature for a desired time. Poly(AAm-co-AA)(90/10) partial sodium salt, poly(AAm-co-AA) 90/10, Mw 200,000) is purchased from Polysciences, Inc. and used as received. Kymene or PAE solutions of different solid contents is purchased from Solenis as an aqueous solution and used as received. 0.07% of PAAm-PAA and about 0.1% Kymene was mixed together in PBS and pre-treated at 60° C. for about 6 hours. After the heat pre-treatment, the IPC saline is filtered using a 0.22 micron membrane filter and cooled down back to room temperature. 5 ppm hydrogen peroxide maybe added to the final IPC saline to prevent bioburden growth and the IPC saline is filtered using a 0.22 micron membrane filter.

Preparation of Polymerizable Compositions

Polymerizable compositions (SiHy lens formulations) are prepared to have the following composition: 40 unit parts by weight of G2; 40 unit parts by weight of EOEMA; 1.25 unit parts by weight of AA; 1.5 unit parts by weight of NaMAA; 0.3 unit parts by weight of TEGDMA; 6 unit parts by weight of HEMA; 15 unit parts by weight of MPC (40%) in PG; 8 unit parts by weight of PG; 1.5 unit parts by weight of Norbloc; 0.01 unit parts by weight of RB247; and 0.5 unit parts by weight of Vazo.

The formulation is prepared by adding all the components in their targeted amounts into a clean bottle, with a stir bar to mix at 600 rpm for 30 minutes at room temperature. After all the solid is dissolved, a filtration of the formulation is carried out by using 2.7 μm glass-microfiber-filter (GMF).

Example 3

Polypropylene lens molds are treated under nitrogen with a vacuum UV lamp (Hamamatsu, H2D2 hydrogen deuterium lamp, 160 nm) and then removed to air and allowed to sit for 30 minutes to react with oxygen. Table 1 shows surface energy results upon treatment.

TABLE 1

| molds | Distance to Source (mm) | treatment time (min) | surface energy (dyn/cm) |
|---|---|---|---|
| Polypropylene (Control) | NA | 0 | <30 |
| Polypropylene | 30 | 10 | 46 |
| Polypropylene | 30 | 30 | 56 |
| Polypropylene | 160 | 30 | 56 |
| Polypropylene | 160 | 10 | 54-56 |

Example 4

Cast-Molded Silicone Hydrogel Contact Lenses

Polypropylene lens molds are not treated. Lenses obtained using these untreated polypropylene lens mold are used as control.

A lens formulation (prepared in Example 2) is purged with nitrogen at room temperature for 30 to 35 minutes. The $N_2$-purged lens formulation is introduced into the polypropylene lens molds (untreated) and thermally cured in an oven under nitrogen under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes. The molds are opened and the molded lenses are removed from the molds.

The lenses are then hydrated in IPC-1 (prepared in Example 2) for 30 minutes, inspected, and packaged in glass vial in the package saline for sterilization (autoclaved at 121° C. for 45 minutes).

Example 5

Cast-Molded Silicone Hydrogel Contact Lenses

Polypropylene lens molds are Corona treated by using a Tantec Lab-Tec system in air at a distance of 10 mm from the electrode for 0.5s at 2.2 kV and 30 W.

A lens formulation (prepared in Example 2) is purged with nitrogen at room temperature for 30 to 35 minutes. The $N_2$-purged lens formulation is introduced into the corona-treated polypropylene lens molds and thermally cured in an oven under nitrogen under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes. The molds are opened and the molded lenses are removed from the molds.

The lenses are then hydrated in IPC-1 (prepared in Example 2) for 30 minutes, inspected, and packaged in glass vial in the package saline for sterilization (autoclaved at 121° C. for 45 minutes).

Example 6

Cast-Molded Silicone Hydrogel Contact Lenses

Polypropylene lens molds are exposed to UV fusion lamp irradiation for approximately 2 seconds using the H+ bulb at an approximate distance of 2 cm.

A lens formulation (prepared in Example 2) is purged with nitrogen at room temperature for 30 to 35 minutes. The $N_2$-purged lens formulation is introduced into the polypropylene lens molds treated above and thermally cured in an oven under nitrogen under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes. The molds are opened and the molded lenses are removed from the molds.

The lenses are then hydrated in IPC-1 (prepared in Example 2) for 30 minutes, inspected, and packaged in glass vial in the package saline for sterilization (autoclaved at 121° C. for 45 minutes).

Example 7

Cast-Molded Silicone Hydrogel Contact Lenses

Polypropylene lens molds are treated under nitrogen with a vacuum UV lamp for 30 minutes at a distance of 30 mm and then removed to air and allowed to sit for 30 minutes to react with oxygen.

A lens formulation (prepared in Example 2) is purged with nitrogen at room temperature for 30 to 35 minutes. The $N_2$-purged lens formulation is introduced into the polypropylene lens molds (treated above) and thermally cured in an oven under nitrogen under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes. The molds are opened and the molded lenses are removed from the molds.

The lenses are then hydrated in IPC-1 (prepared in Example 2) for 30 minutes, inspected, and packaged in glass vial in the package saline for sterilization (autoclaved at 121° C. for 45 minutes).

Example 8

Cast-Molded Silicone Hydrogel Contact Lenses

Polypropylene lens molds are treated under nitrogen with a vacuum UV lamp for 10 minutes at a distance of 160 mm and then removed to air and allowed to sit for 30 minutes to react with oxygen.

A lens formulation (prepared in Example 2) is purged with nitrogen at room temperature for 30 to 35 minutes. The $N_2$-purged lens formulation is introduced into the polypropylene lens molds (treated above) and thermally cured in an oven under nitrogen under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 80° C. for about 30 minutes; ramp from 80° C. to 100° C. at a ramp rate of about 7° C./minute; and holding at 100° C. for about 30 minutes. The molds are opened and the molded lenses are removed from the molds.

The lenses are then hydrated in IPC-1 (prepared in Example 2) for 30 minutes, inspected, and packaged in glass vial in the package saline for sterilization (autoclaved at 121° C. for 45 minutes).

Example 9

The coated SiHy contact lenses obtained in Examples 4-8 have the lens properties reported in Table 2.

TABLE 2

| Example # | Treatment Condition | Contact Angle (°) OOP | WBUT |
|---|---|---|---|
| 4 | Non (control) | 56 ± 2 | 14.1 ± 3.2 |
| 5 | Corona treatment | 36 ± 3 | 39.9 ± 26.5 |
| 6 | UV Fusion | 63 ± 3 | 26.7 ± 4.9 |
| 7 | 30 minutes vacuum UV | 30 ± 2 | 36.0 ± 4.0 |
| 8 | 10 minutes vacuum UV | 30 ± 2 | 38.0 ± 8.2 |

All the publications, patents, and patent application publications, which have been cited herein above in this application, are hereby incorporated by reference in their entireties.

What is claimed is:

1. A method for producing coated silicone hydrogel contact lenses, comprising the steps of:

(1) obtaining a lens mold made of a hydrophobic plastic material, wherein the lens mold comprises a first mold half having a first molding surface and a second mold half having a second molding surface;

(2) treating the first and second molding surfaces by using a vacuum UV or a corona treatment;

(3) introducing a polymerizable composition into the lens mold obtained in step (2), wherein the polymerizable composition comprises (a) at least one polysiloxane vinylic crosslinker and/or at least one siloxane-containing vinylic monomer, (b) from about 0.5% to about 4% by weight of at least one carboxyl-containing vinylic monomer relative to the total amount of all polymerizable components, (c) at least one hydrophilic vinylic monomer, (d) optionally at least one non-silicone vinylic crosslinker, and (e) at least one free-radical initiator;

(4) curing thermally or actinically the polymerizable composition in the lens mold to form a silicone hydrogel lens precursor comprising a bulk silicone hydrogel material that comprises carboxyl groups;

(5) optionally hydrating the silicone hydrogel lens precursor obtained in step (4) in water or an aqueous solution to obtain a hydrated silicone hydrogel contact lens; and (6) heating the silicone hydrogel lens precursor obtained in step (4) or the hydrated silicone hydrogel contact lens obtained in step (5) directly in an aqueous solution having a pH from about 6.5 to about 9.5 and including at least one water-soluble, thermally-crosslinkable hydrophilic polymeric material at a temperature from about 60° C. to about 140° C. to form a coated silicone hydrogel contact lens comprising the bulk silicone hydrogel material and a layer of a crosslinked hydrophilic polymeric material that is covalently attached onto the bulk silicone hydrogel material, wherein the coated silicone hydrogel contact lens in fully-hydrated state exhibits a water-break-up-time (WBUT) of at least 10 seconds and an oxygen permeability of at least 50 barrers.

2. The method of claim 1, wherein the polymerizable composition comprises from about 0.7% to about 3.5% by weight of said at least one carboxyl-containing vinylic monomer relative to the total amount of all polymerizable components.

3. The method of claim 2, wherein said at least one carboxyl-containing vinylic monomer is selected from the group consisting of acrylic acid, methacrylic acid, ethylacrylic acid, propylacrylic acid, (meth)acryloyloxyacetic acid, mono-2-[(meth)acryloyloxy]ethyl succinate, (meth)acryloyloxypropanoic acid, (meth)acryloyloxybutanoic acid, and combinations thereof.

4. The method of claim 2, wherein the polymerizable composition comprises from about 30% to about 65% by weight of component (a) and/or from about 30% to about 65% by weight of component (c), relative to the total amount of all polymerizable components.

5. The method of claim 4, wherein the sum of the amounts of components (a) to (e) is at least about 85% by weight, relative to the total amount of all polymerizable components in the polymerizable composition.

6. The method of claim 5, wherein the polymerizable composition further comprises one or more polymerizable components selected from the group consisting of a non-silicone hydrophobic vinylic monomer, a UV-absorbing vinylic monomer, a polymerizable UV/high-energy-violet-light absorbing compound, a polymerizable photochromic compound, a polymerizable tinting agent, and combinations thereof.

7. The method of claim 5, wherein the polymerizable composition comprises (a) at least one hydrophilized polysiloxane vinylic crosslinker, (b) said at least one carboxyl-containing (meth)acryloxy monomer, (c) hydroxyethyl methacrylate and at least one C1-C2 alkoxyethyl (meth) acrylate, (d) said at least one non-silicone vinylic crosslinker, (e) said at least one free-radical initiator, and (f) at least one solvent selected from the group consisting of water, propylene glycol, a polyethyleneglycol having a molecular weight of about 400 Daltons or less, and combinations thereof.

8. The method of claim 7, wherein the weight ratio of said at least one $C_1$-$C_2$ alkoxyethyl (meth)acrylate to hydroxyethyl methacrylate in the polymerizable composition is about 40 to about 20.

9. The method of claim 8, wherein said at least one hydrophilized polysiloxane vinylic crosslinker comprises at least about 1.50 milliequivalent/gram ("meq/g") of hydrophilic moieties, which are hydroxyl groups (—OH), carboxyl groups (—COOH), amino groups (—$NHR_{N1}$ in which $R_{N1}$ is H or $C_1$-$C_2$ alkyl), amide moieties (—CO—$NR_{N1}R_{N2}$ in which $R_{N1}$ is H or $C_1$-$C_2$ alkyl and $R_{N2}$ is a covalent bond, H, or $C_1$-$C_2$ alkyl), acylamino groups (—CO—$NHR_{N1}$ in which $R_{N1}$ is $C_1$-$C_3$ alkyl), urethane moieties (—NH—CO—O—), urea moieties (—NH—CO—NH—), a polyethylene glycol chain of

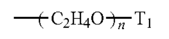

in which n is an integer of 2 to 20 and $T_1$ is H, methyl or acetyl or a phosphorylcholine group, or combinations thereof.

10. The method of claim 8, wherein said at least one hydrophilized polysiloxane vinylic crosslinker is a polysiloxane vinylic crosslinker that comprises (1) a polysiloxane segment comprising dimethylsiloxane units and hydrophilized siloxane units each having one methyl substituent and one monovalent $C_4$-$C_{40}$ organic radical substituent having 2 to 6 hydroxyl groups and (2) two terminal (meth) acryloyl groups.

11. The method of claim 10, wherein said at least one hydrophilized polysiloxane vinylic crosslinker comprises a polysiloxane vinylic crosslinker of formula (1)

(1)

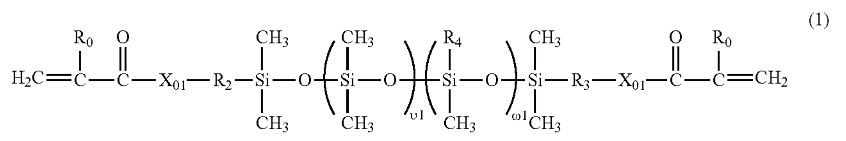

in which:

υ1 is an integer of from 30 to 500 and @ 1 is an integer of from 1 to 75, provided that ω1/υ1 is from about 0.035 to about 0.15;

$X_{01}$ is O or $NR_n$ in which $R_n$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (7)

(2)

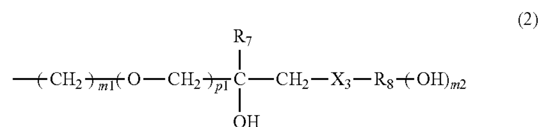

(3)

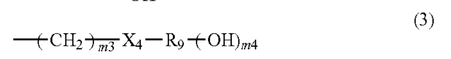

(4)

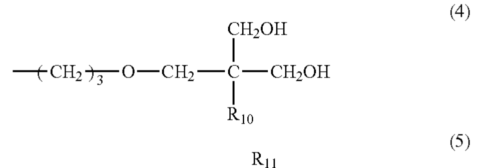

(5)

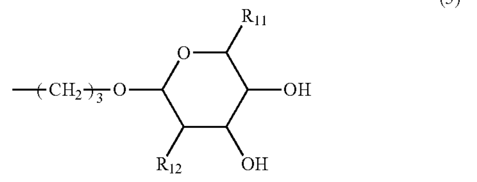

-continued (6)

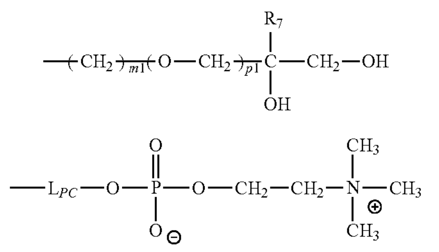

(7)

p1 is zero or 1; m1 is an integer of 2 to 4; m2 is an integer of 1 to 5; m3 is an integer of 3 to 6;

m4 is an integer of 2 to 5;

$R_7$ is hydrogen or methyl;

$R_8$ is a $C_2$-$C_6$ hydrocarbon radical having (m2+1) valencies;

$R_9$ is a $C_2$-$C_6$ hydrocarbon radical having (m4+1) valencies;

$R_{10}$ is ethyl or hydroxymethyl;

$R_{11}$ is methyl or hydroxymethyl;

$R_{12}$ is hydroxyl or methoxy;

$X_3$ is a sulfur linkage of —S— or a tertiary amino linkage of —$NR_{13}$— in which $R_{13}$ is $C_1$-$C_1$ alkyl, hydroxyethyl, hydroxypropyl, or 2,3-dihydroxypropyl;

$X_4$ is an amide linkage of

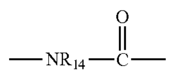

or

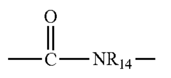

in which $R_{14}$ is hydrogen or $C_1$-$C_{10}$ alkyl;

$L_{PC}$ is a divalent radical of

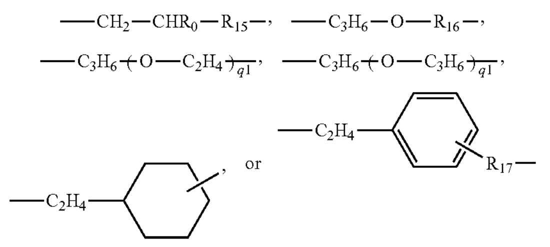

in which q1 is an integer of 1 to 20, $R_{15}$ is a linear or branched $C_1$-$C_{10}$ alkylene divalent radical, $R_{16}$ is a linear or branched $C_3$-$C_{10}$ alkylene divalent radical, and $R_{17}$ is a direct bond or a linear or branched $C_1$-$C_4$ alkylene divalent radical.

12. The method of claim 11, wherein the step of heating is performed by autoclaving the silicone hydrogel lens precursor immersed in a packaging solution in a sealed lens package at a temperature of from about 115° C. to about 125° C. for approximately 20-90 minutes, wherein said at least one water-soluble and thermally crosslinkable hydrophilic polymeric material is a three-dimensional network and thermally-crosslinkable groups within the network or being attached to the network.

13. The method of claim 12, wherein said at least one water-soluble and thermally crosslinkable hydrophilic polymeric material is: (I) one or more multi-armed polyethylene glycols each having terminal epoxy groups; (II) a mixture of a multi-armed polyethylene glycol having terminal epoxy group and one or more polyethylene glycol each having terminal functional groups selected from the group consisting of primary amine groups, secondary amine groups, carboxyl groups, thiol groups, and combinations thereof; (III) a partial reaction product of a multi-armed polyethylene having terminal epoxy groups and a hydrophilicity-enhancing agent having at least one reactive functional group selected from the group consisting of amino group, carboxyl group, thiol group, and combination thereof; (IV) a partial reaction product of an azetidinium-containing polymer and a first hydrophilicity-enhancing agent having at least one reactive functional group selected from the group consisting of a primary amine group, a secondary amine group, a carboxyl group, a thiol group, and combinations thereof, wherein the first hydrophilicity-enhancing agent is (i) a primary amino-, secondary amino-, carboxyl- or thiol-containing monosaccharide, (ii) a primary amino-, secondary amino-, carboxyl- or thiol-containing disaccharide, or (iii) a primary amino-, secondary amino-, carboxyl- or thiol-containing oligosaccharide; or (V) a partial reaction product of an azetidinium-containing polymer and a second hydrophilicity-enhancing agent having at least one reactive functional group selected from the group consisting of a primary amine group, a secondary amine group, a carboxyl group, a thiol group, and combinations thereof, wherein the second hydrophilicity-enhancing agent is a hydrophilic polymer having one or more primary or secondary amino groups, one or more carboxyl groups, one or more thiol groups, or combinations thereof and is: (i) a polysaccharide having primary amine groups, secondary amine groups, carboxyl groups, or combinations thereof, (ii) a poly (ethylene glycol) having one sole functional group of —$NH_2$, —SH or —COOH, (iii) a poly (ethylene glycol) having two terminal functional groups selected from the group consisting of —$NH_2$, —COOH, —SH, and combinations thereof, (iv) a multi-arm poly(ethylene glycol) having one or more functional groups selected from the group consisting of —$NH_2$, —COOH, —SH, and combinations thereof, (v) a monoamino-, monocarboxyl-, diamino- or dicarboxyl-terminated homo- or copolymer of a first non-reactive hydrophilic vinylic monomer, or (vi) a copolymer which is a polymerization product of a composition comprising (1) from about 0.1% to about 30% of a reactive vinylic monomer and (2) a second non-reactive hydrophilic vinylic monomer, wherein the reactive vinylic monomer is a vinylic monomer having a functional group selected from the group consisting of carboxyl group, a primary amine group, and a secondary amine group, wherein the first non-reactive hydrophilic vinylic monomer and the second non-reactive hydrophilic vinylic monomer independent of each other are a hydrophilic vinylic monomer free of any carboxyl group, primary amine group, secondary amine group, epoxide group, isocyanate group, azlactone group, or aziridine group.

14. The method of claim 13, wherein the aqueous solution of step (6) has a pH of from about 7.0 to about 8.2, wherein the aqueous solution comprises from about 0.01% to about 2% by weight of said at least one water-soluble thermally-crosslinkable hydrophilic polymeric material.

15. The method of claim 14, wherein the aqueous solution of step (6) comprises a mixture of a monobasic dihydrogen phosphate and dibasic monohydrogen phosphate for maintaining the pH of the aqueous solution, wherein the total concentration of the monobasic dihydrogen phosphate and the dibasic monohydrogen phosphate is at least 30 mM.

* * * * *